Nov. 12, 1968 R. LAMBERG 3,410,959
CALLED LOOP POLARITY REVERSING THREE-WIRE
TELEPHONE RECORDER COUPLER
Filed Nov. 13, 1964
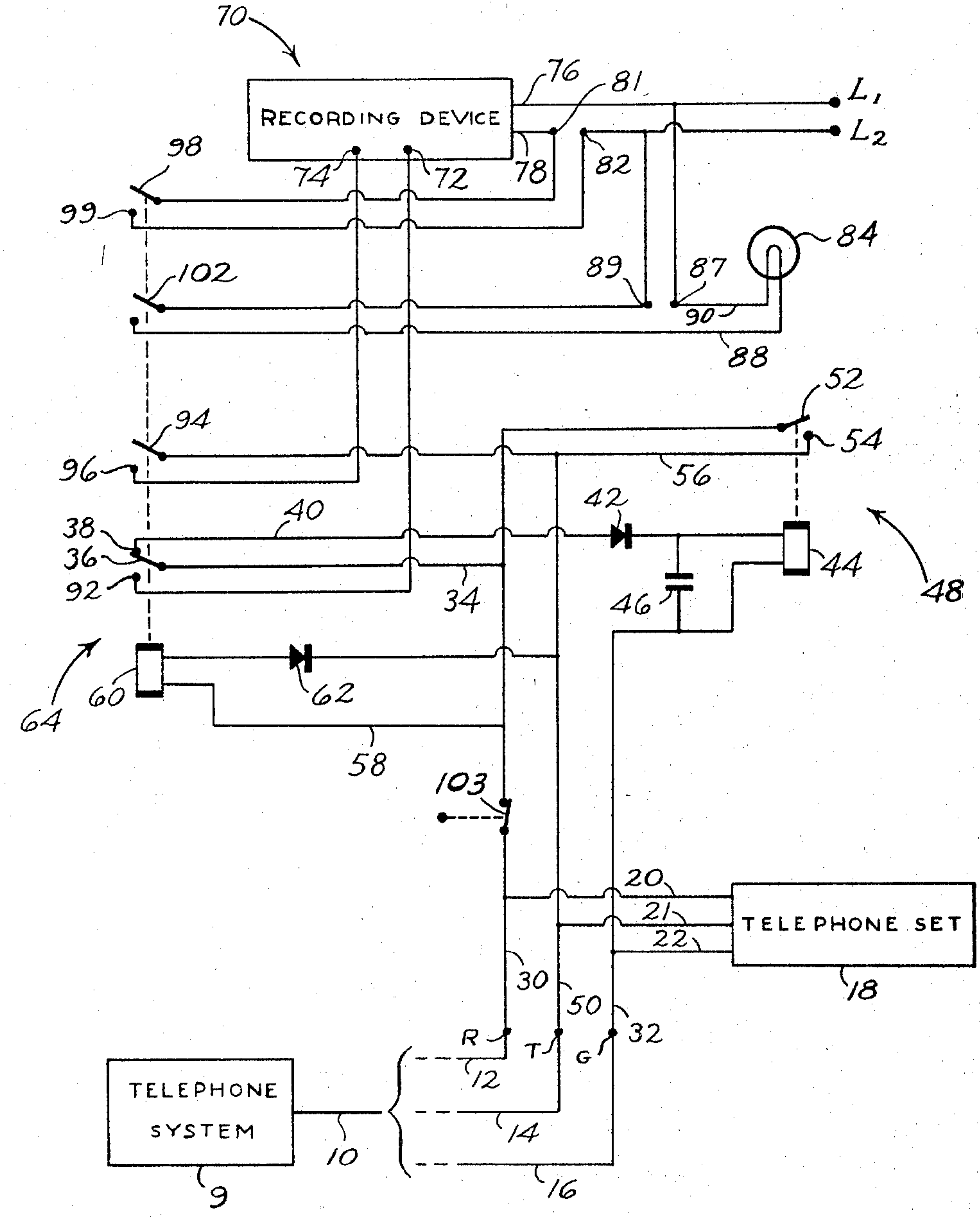
Raymond Lamberg
INVENTOR.
BY Kolisch & Hartwell
Attys.

United States Patent Office 3,410,959

Patented Nov. 12, 1968

3,410,959

CALLED LOOP POLARITY REVERSING THREE-WIRE TELEPHONE RECORDER COUPLER

Raymond Lamberg, Portland, Oreg.
(3619 Ross Lane, Medford, Oreg. 97501)

Filed Nov. 13, 1964, Ser. No. 410,933
11 Claims. (Cl. 179—6)

ABSTRACT OF THE DISCLOSURE

A switching device which responds to called loop polarity reversal in conductors in a three conductor telephone line to connect a recording device for receiving and recording an incoming message at a subscriber's telephone set.

This invention relates to an electronic switching system, and more particularly to a switching system responsive to changes in an independent communications system, operable by these changes to interconnect a recording device or other instrumentality with the communications system, for the purpose of recording information transmitted thereover. The specific embodiment of the invention herein disclosed shows the invention as adapted for use with a conventional telephone system.

Many times after a telephone set has been left unattended, the subscriber of the set would like to know if there have been any calls and the substance of such calls if calls have been made. Conventional telephone sets have no means for recording such information. The only indication of an incoming call is the ringing of a bell provided in the set, and the ringing lasts only so long as a calling party stays on the line.

This invention contemplates means adapted to be connected to the telephone line of a conventional telephone system for recording messages delivered to an unattended telephone set. No significant modifications or alterations of the telephone system, or of the telephone set are necessary. When a telephone subscriber plans to leave his telephone set unattended, the apparatus of this invention is readily placed in operable condition merely by closing a switch completing an electrical circuit between the telephone system and the apparatus contemplated.

It is thus a general object of this invention to provide convenient, automatic means for connection with an existing communications system, including a recording device, operable to record and thus preserve information transmitted over the system.

Another object is to provide a novel switching circuit for connecting a subscriber's telephone line to a recording device whereby the device will operate automatically to record a message of a party placing a call to the subscriber.

More particularly, it is an object to provide a switching circuit responsive to a ringing voltage in a telephone line, which produces a change in conditions in conductors in the telephone line, which change causes a connection to be made between conductors in the telephone line carrying an audio signal to the audio input of a recording device. The connection is maintained until the calling party terminates the call by hanging up his telephone set.

Another object is to provide means for interconnecting a telephone line with a recording device which relies for operation on electrical conditions inherent within the telephone system.

A still further object is to provide means in such a switching system, operable to indicate whether the system is operating or not.

Other objects and advantages will become more fully apparent from the accompanying drawing, which is a circuit diagram showing the system contemplated connected to a three conductor telephone line.

Referring to the drawing, a conventional telephone system 9 includes a telephone line 10 connecting the system to the telephone set of a subscriber. In one type of telephone system, this line may have three conductors, identified as ring, tip and ground conductors, shown in the drawing at 12, 14, and 16, respectively. In such a telephone system, and prior to the subscriber receiving a telephone call, established voltage conditions may exist in these conductors, which, for the purpose of explanation, may be assumed to be a voltage difference of about 50 volts between the ring and tip conductors, with the polarity such that the ring conductor is negative relative to the tip conductor.

Further explaining the type of system indicated, when a call is put through to a subscriber, a ring voltage is applied between the ring and ground conductors, which may be a 20 cycle A.C. voltage, having a level in the range of 60 to 70 volts R.M.S. A subscriber, on picking up the telephone receiver, momentarily short-circuits the ring and tip conductors, with the polarity between these two conductors then reversing, the reversal being produced by the telephone system itself, in response to the short circuit described. The ring voltage impressed between ring and ground conductors ceases with picking up of the receiver and momentary short-circuiting as described, and this also is done by the telephone system.

In the drawings the telephone set of a subscriber is indicated at 18, and such is shown connected to the ring, tip and ground conductors, in a conventional manner, through conductors 20, 21, and 22.

According to this invention a switching circuit is contemplated which is connected to the ring, tip and ground conductors of the telephone line, and operates to feed an audio signal carried by the ring and tip conductors to the audio input of an audio-actuated instrumentality such as a recording device, with this done automatically on a call being put through to the subscriber. The switching circuit also operates to connect a power source to the power input leads of the instrumentality, to place it in operative condition, and to energize an indicator such as the lamp which shows that the instrumentality is in operation.

More specifically, connected to designated terminals R and G (connected to the ring and ground conductors, respectively), are conductors 30, 32. Forming a series circuit between conductors 30, 32 are a conductor 34, switch blade 36, switch contact 38 (blade 36 and contact 38 forming a normally closed switch in the circuit), a conductor 40, rectifier 42, and a solenoid or coil 44 and capacitor 46 connected electrically in parallel between rectifier 42 and conductor 32. Coil 44, also referred to as a switch-actuating means, is part of a relay 48, and with energizing of the coil by a ring voltage impressed between terminals R and G, as will later be apparent, a condition is set up in the circuit similar to what occurs when a subscriber picks up his receiver in a telephone set.

More specifically, connected to terminal T which is connected to the tip conductor is a conductor 50. Arranged in series between conductors 30 and 50 (and thus between terminals R and T) is a switch blade 52, a switch contact 54 (blade 52 and contact 54 constituting a normally open switch) and a conductor 56. This switch is part of relay 48, and on energizing of coil 44, blade 52 makes contact with contact 54 to close the switch, thus to produce a short circuit between terminals R and T similar to the short circuit produced when a subscriber picks up his telephone receiver.

As previously indicated, on a short circuit being produced between the ring and tip conductors in the telephone line shown, the telephone system reflects this in a change in polarity of the ring and tip conductors. Shown connected to ring and tip conductors, through conductors 30 and 50, and disposed in series, is a conductor 58, a solenoid or coil 60 (part of a relay 64) and a rectifier 62. During nonuse of the telephone line, and with the ring conductor at a greater negative potential than the tip conductor, rectifier 62 prevents current flow through this circuit (comprising solenoid 60 and the rectifier). With reversal in the polarity of the ring and tip conductors current flows through the circuit comprising coil 60 and rectifier 62, with energizing of the coil.

In the drawings an audio-actuated instrumentality, i.e., a recording device, is shown at 70, which may take any conventional form. As is typical in such recording devices, it includes a pair of audio input terminals shown at 72, 74, which supply the device with the audio signal that is to be transcribed. Power leads for the device are shown at 76, 78 and these are connected to a power source L1, L2 upon a closed circuit being produced between terminals 81, 82.

Also shown in the drawings is an indicator 84 which may be a bulb energized through conductors 90, 88. With a closed circuit between terminals 89, 87, the bulb is supplied with the power required to light the bulb.

Switch blade 36, described in connection with the circuit energized by a ring voltage, is part of relay 64 and is ganged to solenoid 60, so that on energizing of the solenoid, it is moved away from contact 38 to open the circuit between terminals R and G through solenoid 44. With energizing of solenoid 60, the blade engages a contact 92 to complete a circuit from terminal 72 of the recording device and conductor 30 to the ring conductor of the telephone line. Blade 36 and contact 92 function as another switch in the proposed circuit. Thus, it is noted that blade 36 is shared by two switches. Also ganged to solenoid 60 and part of relay 64 is a blade 94, which, on energizing of the solenoid, engages a contact 96 to complete a circuit between audio input terminal 74 and the tip conductor through conductor 50. Blade 94 and contact 96 constitute a switch herein. An audio signal is usually carried between the ring and tip conductors, and thus with solenoid 60 energized, this signal is delivered to terminals 72, 74 of the recording device.

At 98 is a blade ganged to solenoid 60 and part of relay 64 which, with the solenoid energized, closes a circuit between terminals 81, 82 by engaging contact 99. Blade 98 and contact 99 together constitute a switch. Thus, with the solenoid or relay 64 energized, power is supplied to the recording device to operate it simultaneously with an audio signal being delivered through the audio input terminals.

Indicator 84 is energized through blade 102 ganged to solenoid 60, and with the solenoid energized completes a circuit between terminals 89, 87 in the circuit supplying power to the indicator.

Shown at 103 is a switch which may be opened manually to disconnect the circuit described.

Relay 48 and relay 64 are both conventional, and each includes the usual biasing means for returning the switch blade or blades in the relay to their original position, on energizing and subsequent deenergizing of the relay.

Briefly describing the operation of the system, during nonuse of the telephone set by the subscriber, an established polarized voltage exists between ring and tip conductors. With a ring voltage impressed between the ring and ground conductors, relay 48 is energized, causing blade 52 to engage contact 54, and a short circuit to be produced between the ring and tip conductors. This short circuit, as earlier indicated, causes the telephone system to remove the ring voltage from the ring and ground conductors. On removal of such voltage, coil 44 becomes deenergized and the short circuit produced by blade 52 and contact 54 is thereupon removed. As a further consequence of the momentary short circuit produced the polarity of the voltage between the ring and tip conductors becomes reversed after removal of the short circuit. With such a reversal, current flows through the coil of relay 64.

On such current flowing through coil 60, blade 36 moves away from contact 38, opening the circuit which supplied power to relay 48, and at the same time producing a connection between one of the audio input terminals and the ring conductor. Blade 94 moves to engage contact 96, and connects the other audio input terminal to the tip conductor. Further, on actuation of relay 64, power is supplied to the recording device and to indicator 84. With this condition of the circuit, any message relayed over the telephone line is recorded by the recording device.

When the caller completes a call and hangs up his receiver, there is another reversal in the polarity between the ring and tip conductors, these conductors then having their original established voltage reinstated. This results in deenergizing of coil 60, with the various switch blades returning to their original positions.

The switching system described depends upon electrical conditions in the telephone line for its operation. The system is relatively simple and easily installed on existing subscribers' lines. The system in no way impairs the usual operation of a subscriber's telephone set. Nevertheless it affords a reliable method for recording a message in the event a subscriber is not at home and unable to answer a telephone call personally.

The system described is adapted for many uses and is susceptible to modification, as should be apparent to those skilled in the art. It is intended to cover all variations and modifications of the invention as would be apparent to those skilled in the art and that come within the scope of the appended claims.

It is claimed and desired to secure by Letters Patent:

1. In a switching circuit for actuating an audio-operated instrumentality, which is controlled by a telephone system, through a multiple conductor telephone line including at least three conductors, each having established voltage conditions therein, means responsive to a relative voltage change in a combination of two of the conductors, directly to connect another combination of two conductors, whereby the telephone line system produces a polarity change in said other combination of two conductors, and switch means energized by said polarity change operable on such energizing to actuate said instrumentality by feeding an audio signal on two of the telephone line conductors to the instrumentality.

2. In a switching circuit for actuating a recording device having a pair of input terminals, said circuit being controlled by a telephone system through a multiple conductor telephone line, including at least three conductors, each having established voltage conditions therein, circuit means connected between a combination of two conductors responsive to a relative voltage change in said combination of two of the conductors, directly to connect another combination of two conductors, whereby the telephone system produces a polarity change in said other combination of two conductors, switch means energized by said polarity change operable on such energizing to connect said input terminals of said recording device to said other combination of two conductors whereby an audio signal carried by the conductors is fed to said input terminals, and means breaking said circuit means upon said polarity change occurring.

3. A switching system operated from a power source, for use with a multiple conductor telephone line connected to a telephone system, where said line includes at least three conductors, each having established voltage conditions therein, said switching system comprising a recording device, including a pair of audio input terminals for the supply of an audio signal to the device, and power leads adapted when supplies with current to power the recording device, and a switching circuit controlling operating periods of the recording device responsive to voltage conditions in the multiple conductor telephone line, said switching circuit including circuit means responsive to a relative voltage change in a combination of two of the conductors of the telephone line, operable directly to connect another combination of two condutcors whereby the telephne system produces a polarity change in said other combination of two conductors, switch means energized by said polarity change operable when the switch means is so energized to connect the input terminals of the recording device to said other combination of two conductors in the telephone line, and means for breaking said circuit means when said polarity change occurs.

4. The system of claim 3, which further comprises means connecting said power source and said power leads when said polarity change occurs.

5. A switching circuit for connecting a recording device with audio input terminals to a telephone system through a telephone line, including at least three conductors, identified as ring, tip and ground conductors, each of which has established voltage conditions therein, said switching circuit comprising means responsive to a relative voltage change between said ground conductor and said ring conductor, operable directly to connect the ring and tip conductors of the telephone line, whereby the telephone line system produces a polarity change in said ring and tip conductors, a circuit including a solenoid and rectifier between said ring and tip conductors, made conductive on such a polarity change, and a pair of switches associated with the solenoid of said circuit, actuated by the conduction of electricity in said circuit operable when actuated to connect the audio input terminals of the recording device to the ring and tip conductors, whereby an audio signal carried by the ring and tip conductors may be fed into said recording device.

6. In a switching system to be used with a power source and a three conductor telephone line, including ring, tip and ground conductors, a first circuit adapted to be connected between the ring and ground conductors, including a solenoid and a first switch, in series, a second circuit adapted to be connected between the ring and tip conductors, including a solenoid and rectifier in series, a third circuit adapted to be connected between said ring and tip conductors, including a second switch operable when actuated to short-circuit said ring and tip conductors, said second switch being associated with said solenoid of said first circuit to be controlled when such solenoid is energized and deenergized, said first switch of said first circuit being associated with said solenoid of said second circuit to be controlled when such solenoid is energized and deenergized, a recording device having a pair of audio input terminals and power leads for powering the device, and third, fourth and fifth switches associated with said solenoid of said second circuit to be actuated thereby, said third and fourth switches when actuated connecting said input terminals to said ring and tip conductors of said telephone line, and said fifth switch when actuated connecting said power leads to said power source.

7. A switching circuit adapted to be connected to a three conductor telephone line of a telephone system, for controlling actuation of a recording device, said switching circuit comprising a first circuit adapted to be connected between two conductors of said telephone line, having a solenoid and a first switch in series, a second circuit adapted to be connected to another combination of two conductors in the line, having a solenoid and a recitifier in series, a third circuit adapted to be connected to said second combination of conductors of the telephone line, including a second switch for short-circuitng said other pair of conductors, said second switch being associated with said solenoid of said first circuit, to be controlled when such solenoid is energized and deenergized, and said first switch being associated with said solenoid of said second circuit to be likewise controlled, and a fourth circuit for connecting the audio input terminals of a recording device to said second combination of conductors, including a switch, said switch being associated with said solenoid of said second circuit to be controlled when such solenoid is energized and deenergized.

8. A switching circuit for the connection of the audio input terminals of an audio-actuated instrumentality to a telephone line, where the line includes at least three conductors, said switching circuit comprising a first circuit adapted to be responsive to a ringing voltage established between a combination of two of the conductors in the telephone line, including means for actuating a switch, a second circuit adapted to be connected between another combination of two conductors, including another means for actuating a switch and a recitifier inhibiting current flow in one direction in the circuit, a switch associated with the means for actuating a switch of the first circuit, actuatable to connect together the conductors in said other combination of two conductors, and another circuit for connecting the audio input terminals of the instrumentality to said other combination of two conductors of the telephone line, including another switch, said other switch being associated with the means for actuating a switch of said second circuit.

9. The switching circuit of claim 8, which further includes yet another switch associated with the means for actuating a switch of said second circuit, for connecting a power source to said instrumentality.

10. The switching circuit of claim 9, which further comprises still another switch associated with the switch-actuating means of the second circuit, for the control of a signal device indicating operation of the instrumantality.

11. A switching system including a recording device, and in combination with a three-conductor telephone line including conductors identified as ring, tip and ground conductors, respectively, said switching system comprising a first circuit connected between the ring and ground conductors, including switch-actuating means for actuating a switch, and in series with said switch-actuating means a normally closed switch, a second circuit connected between the ring and tip conductors, including a second switch-actuating means, and in series with said second switch-actuating means a rectifier normally inhibiting current flow through the circuit in one direction, a third circuit including a normally open switch connected between the ring and tip conductors, with said switch associated with the first-mentioned switch-actuating means to be closed when the actuating means is energized, said switch of the first circuit being associated with the second switch-actuating means to be opened on energizing of the switch-actuating means, audio input terminals for the recording device, and a pair of switches actuated by the second switch-actuating means, for connecting said audio input terminals to said ring and tip conductors when the second switch-actuating means is energized.

References Cited

UNITED STATES PATENTS

| | | | |
|---|---|---|---|
| 2,312,427 | 3/1943 | Lomax | 179—18 |
| 2,883,461 | 4/1959 | Cain | 179—6 |
| 2,988,602 | 6/1961 | Gatzert | 179—18 |

FOREIGN PATENTS

| | | |
|---|---|---|
| 782,384 | 9/1957 | Great Britain. |

BERNARD KONICK, *Primary Examiner.*

R. F. CARDILLO, JR., *Assistant Examiner.*